US009426728B2

(12) United States Patent
Draznin et al.

(10) Patent No.: US 9,426,728 B2
(45) Date of Patent: Aug. 23, 2016

(54) NETWORK SELECTION BASED ON ONE OR MORE FACTORS

(75) Inventors: Sagiv Draznin, Walnut Creek, CA (US); Lalit R. Kotecha, San Ramon, CA (US); Arda Aksu, Martinez, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1135 days.

(21) Appl. No.: 13/294,773

(22) Filed: Nov. 11, 2011

(65) Prior Publication Data

US 2013/0121145 A1    May 16, 2013

(51) Int. Cl.
*H04W 48/18* (2009.01)
*H04L 12/54* (2013.01)
*H04W 88/06* (2009.01)
*H04W 48/06* (2009.01)

(52) U.S. Cl.
CPC ........... *H04W 48/18* (2013.01); *H04L 12/5692* (2013.01); *H04W 48/06* (2013.01); *H04W 88/06* (2013.01)

(58) Field of Classification Search
CPC ..... H04W 36/06; H04W 36/08; H04W 36/10; H04W 36/12; H04W 36/14; H04W 36/165; H04W 36/18; H04W 36/20; H04W 36/22; H04W 36/24; H04W 36/26; H04W 36/30; H04W 36/32; H04B 7/18539; H04B 7/18545
See application file for complete search history.

(56) References Cited

U.S. PATENT DOCUMENTS

| | | | | |
|---|---|---|---|---|
| 8,626,234 | B2 * | 1/2014 | Miller | H04W 48/18 379/106.02 |
| 2002/0087674 | A1 * | 7/2002 | Guilford et al. | 709/223 |
| 2002/0102978 | A1 * | 8/2002 | Yahagi | 455/437 |
| 2002/0177466 | A1 * | 11/2002 | Laurila et al. | 455/552 |

* cited by examiner

*Primary Examiner* — Alvin Zhu

(57) ABSTRACT

A device may receive a network access request and perform at least one of signal strength measurements of a first wireless network and a second wireless network, a determination of a level of congestion of the first wireless network and a level of congestion of the second wireless network, or a determination of an access point name (APN) type associated with the network access request. The device may select one of the first wireless network or the second wireless network based on the performance of the at least one of the signal strength measurements, the determination of the level of congestion of the first wireless network and the level of congestion of the second wireless network, or the determination of the APN type associated with the network access request. The device may further connect to the selected one of the first wireless network or the second wireless network.

20 Claims, 19 Drawing Sheets

Fig. 4

| APN TYPE ←410 | CELLULAR NETWORK ←420 | WIFI NETWORK ←430 | OTHER NETWORK ←440 |
|---|---|---|---|
| INTERNET | NO | YES | NO |
| IMS | YES | NO | NO |
| APPLICATION | NO | YES | NO |

400

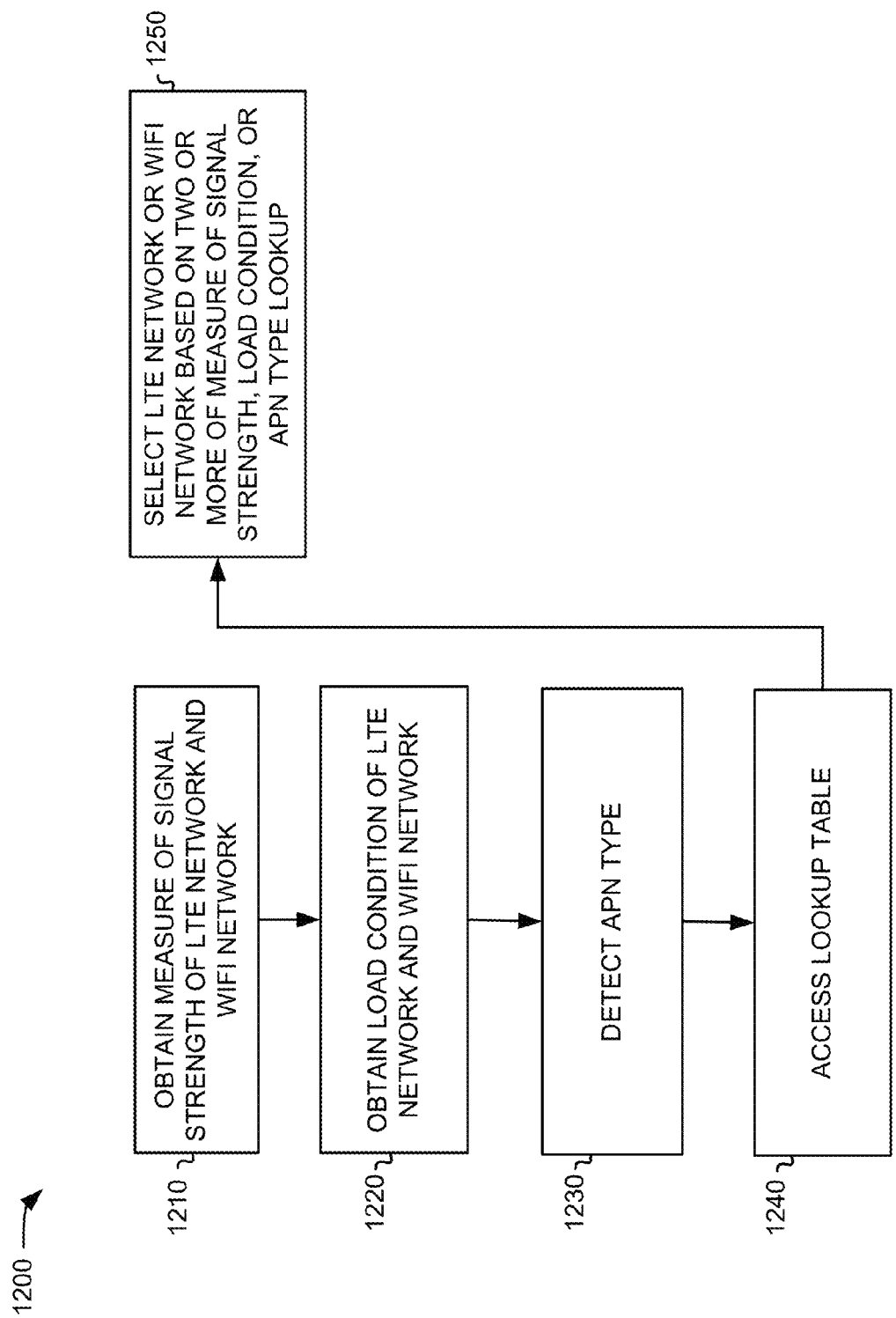

NETWORK SELECTION BASED ON ONE OR MORE FACTORS

BACKGROUND

In an increasingly networked world, more and more traffic, such as data, voice, and video, is transmitted over public and proprietary networks. Wireless networks, in particular, are becoming increasingly popular as networks through which subscribers obtain both voice services (e.g., telephone calls) and data services (e.g., email and web surfing).

Mobile devices, such as smart phones, may include logic to connect to the network through multiple different radio interfaces. For instance, a mobile device may include circuits to connect to a network through an IEEE 802.11 (WiFi) access network, a Third Generation (3G) cellular access network, and/or a Fourth Generation (4G) cellular access network.

BRIEF DESCRIPTION OF THE DRAWINGS

FIG. 4 is a diagram illustrating an example data structure that may be associated with the user device of FIG. 1;

FIGS. 9-12 are flow charts illustrating example processes that may correspond to a portion of the process of FIG. 8.

DETAILED DESCRIPTION OF PREFERRED EMBODIMENTS

The following detailed description refers to the accompanying drawings. The same reference numbers in different drawings may identify the same or similar elements.

Techniques described herein may relate to the use of different radio access networks, by a mobile device, for connecting to a network. For example, the mobile device may select, based on one or more factors, between multiple different access networks, such as a WiFi access network and a cellular network. The factors may include, for example, the signal strengths of the different access networks, the current load of the different access networks, the access point name (APN) type identified by a network access request of the mobile device, or a combination of these and/or other factors.

Figure 1:
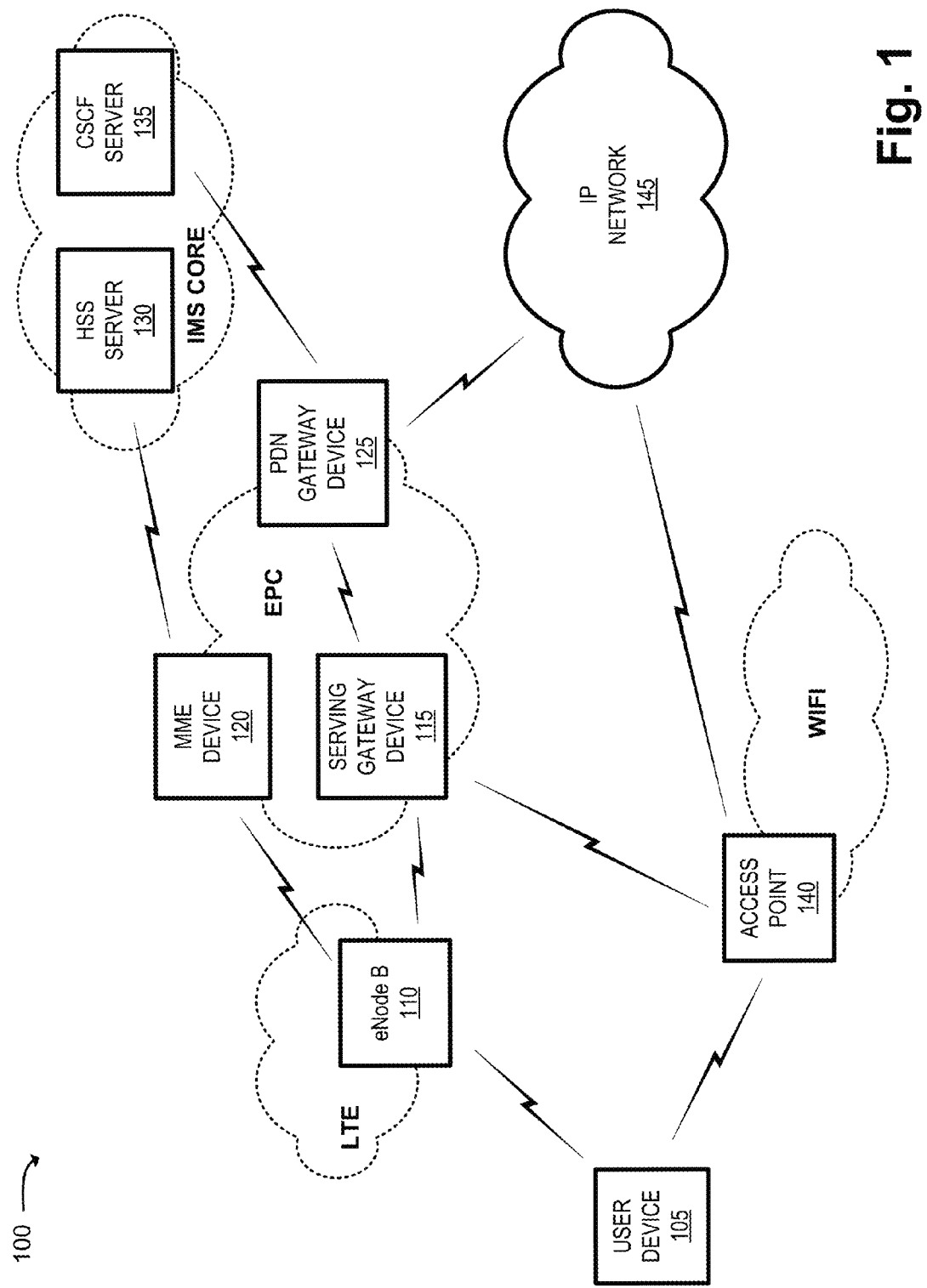
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 105, a base station 110 (hereinafter referred to as "eNode B 110"), a serving gateway device 115 (hereinafter referred to as "SGW 115"), a mobility management entity device 120 (hereinafter referred to as "MME 120"), a packet data network (PDN) gateway device 125 (hereinafter referred to as "PGW 125"), a home subscriber service server 130 (hereinafter referred to as an "HSS server 130"), a call session control function (CSCF) server 135 (hereinafter referred to as "CSCF server 135"), an access point 140, and a network 145. Devices of environment 100 may interconnect via wired connections, wireless connections, or a combination of wired and wireless connections.

Environment 100 may include an evolved packet system (EPS) that includes a long term evolution (LTE) network and/or an evolved packet core (EPC) that operate based on a third generation partnership project (3GPP) wireless communication standard. The LTE network (also referred to as a "cellular network" herein) may be a radio access network (RAN) that includes one or more eNode Bs 110 via which user device 105 communicates with the EPC. The EPC may include SGW 115, MME 120, and/or PGW 125 that enables user device 105 to communicate with network 145 and/or the Internet protocol (IP) multimedia subsystem (IMS) core. The IMS core may include HSS server 130 and/or CSCF server 135 and may manage authentication, session initiation, account information, profile information, etc. associated with user device 105. While described in the context of an EPS, systems and/or methods described herein may, alternatively, be implemented in different types of cellular networks.

User device 105 may include a device, such as a wireless mobile communication device, that is capable of communicating with eNode B 110 and access point 140. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet computer, a camera, a personal gaming system, or another type of mobile computation or communication device.

eNode B 120 may include one or more devices that receive, process, and/or transmit traffic, such as voice, video, text, and/or other data, destined for and/or received from user device 105. eNode B 110 may also receive traffic from and/or send traffic to network 145 and/or the IMS core via the EPC.

SGW 115 may include one or more devices, or other types of computation or communication devices, that gather, process, search, store, and/or provide information in a manner similar to that described herein. SGW 115 may, for example, aggregate traffic received from one or more eNode Bs 110 and may send the aggregated traffic to network 145 (e.g., via PGW 125) and/or other devices associated with the IMS core and/or the EPC. SGW 115 may also receive traffic from the other network devices and/or may send the received traffic to user device 105 via eNode B 110. For example, SGW 115 may receive an instruction (e.g., as a result of a registration operation, handoff operation, and/or some other operation) from MME 120 to establish a connection that permits user device 105 to communicate with other network devices associated with the EPC, the IMS core, and/or network 145. SGW 115 may also receive traffic from access point 140 and forward the traffic to the appropriate destination. In one example, SGW 115 may receive traffic from access point 140 via a secure connection, such as an Internet Protocol Security (IPsec) connection.

MME 120 may include one or more devices, or other types of computation or communication devices, that gather, process, search, store, and/or provide information in a manner similar to that described herein. For example, MME 120 may perform operations associated with a handoff to and/or from the EPS. MME 120 may perform operations to register user device 105 with the EPS, to handoff user device 105 from the EPS to another network, to handoff a user device 105 from the other network to the EPS, and/or to perform other operations.

PGW 125 may include one or more devices, or other types of computation or communication devices, that gather, process, search, store, and/or provide information in a manner similar to that described herein. In one example implementation, PGW 125 may include a device that aggregates traffic received from one or more SGWs 115 and may send the aggregated traffic to network 145 and/or the IMS core (e.g., CSCF server 135). In another example implementation, PGW 125 may receive traffic from network 145 and may send the traffic toward user device 105 via SGW 115 and/or eNode B 110.

HSS server 130 may include one or more server devices, or other types of computation or communication devices, that gather, process, search, store, and/or provide information in a manner similar to that described herein. For example, HSS server 130 may manage, update, and/or store, in a memory associated with HSS server 130, service profile information associated with user device 105 that includes access point names that are permitted for and/or accessible by user device 105, information associated with a user of user device 105 (e.g., a username, a password, a personal identification number (PIN), etc.), rate information, minutes allowed, and/or other information. Access point names identify particular applications services, and/or data that are permitted for user device 105 in the EPS. Additionally, or alternatively, a particular access point name may correspond to a packet data network (PDN) or a set of PDNs (e.g., the Internet, an intranet, etc.) that permit access to other applications, services, and/or data. Additionally, or alternatively, HSS server 130 may include a device that performs authentication, authorization, and/or accounting (AAA) operations associated with a communication session with user device 105.

CSCF server 135 may include one or more server devices, or other types of computation or communication devices, that gather, process, search, store, and/or provide information in a manner similar to that described herein. In one example implementation, CSCF server 135 may execute session initiation protocols (SIPs) associated with establishing a session with user device 105.

Access point 140 may include one or more devices, associated with a WiFi network, that receive, process, and/or transmit traffic, such as voice, video, text, and/or other data, destined for and/or received from user device 105. Access point 140 may also receive traffic from and/or send traffic to network 145 and/or the EPC.

Network 145 may include one or more wired and/or wireless networks. For example, network 145 may include a cellular network, a public land mobile network (PLMN), a second generation (2G) network, a third generation (3G) network, a fourth generation (4G) network, a fifth generation (5G) network, and/or another network. Additionally, or alternatively, network 145 may include a wide area network (WAN), a metropolitan network (MAN), an ad hoc network, an intranet, the Internet, a fiber optic-based network (e.g., a FiOS network), and/or a combination of these or other types of networks. Network 145 may include devices (e.g., routers, switches, gateways, etc.) via which traffic is transported to and/or from the EPS (e.g., via PGW 125), the WiFi network, and/or another network.

Although FIG. 1 shows example components of environment 100, in other implementations, environment 100 may include fewer devices and/or networks, different devices and/or networks, differently arranged devices and/or networks, and/or additional devices and/or networks than depicted in FIG. 1. Additionally, or alternatively, one or more components of environment 100 may perform one or more tasks described as being performed by one or more other components of environment 100.

Figure 2:
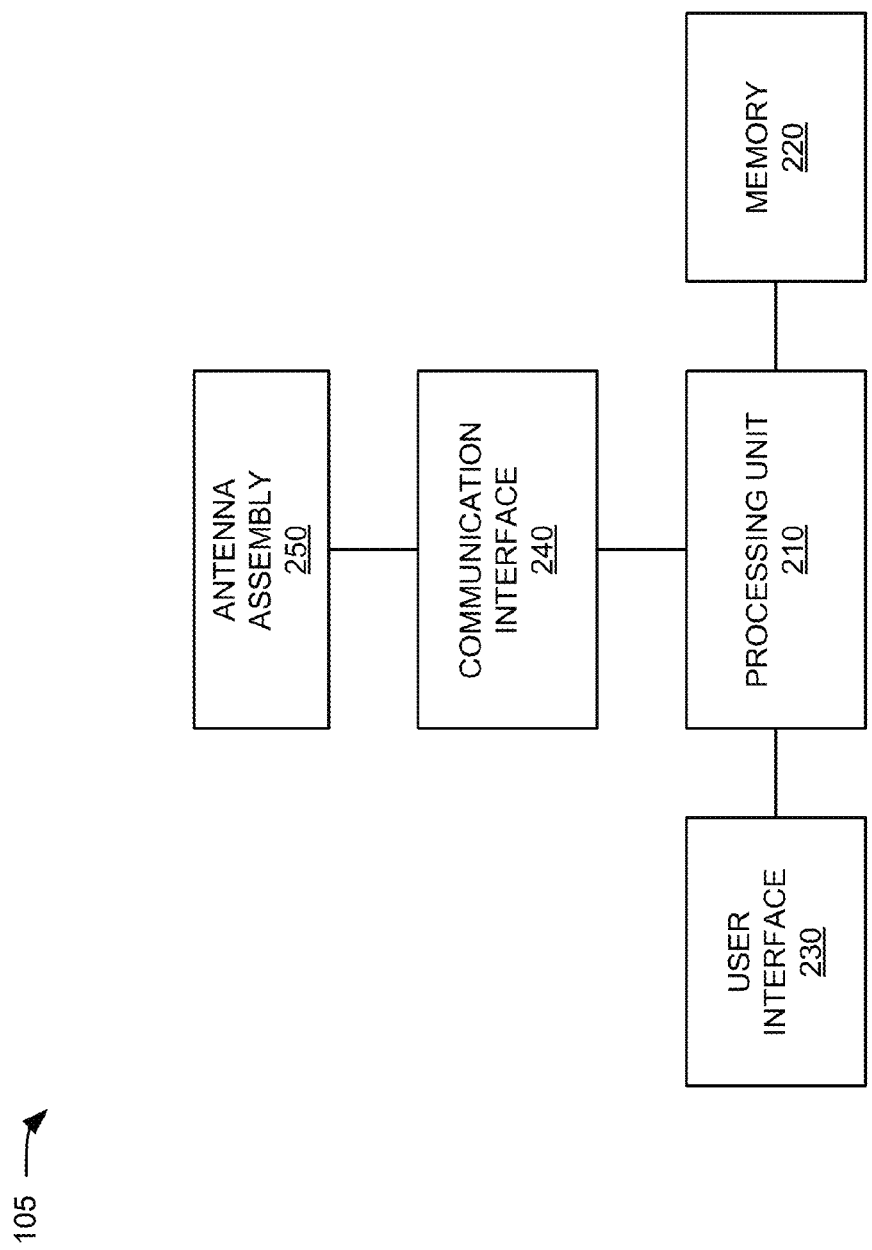
FIG. 2 depicts a diagram of exemplary components of the user device of FIG. 1.

FIG. 2 depicts a diagram of exemplary components of user device 105. eNode B 110, SGW 115, MME 120, PGW 124, HSS server 130, CSCF server 135, and access point 140 may include similar components. As illustrated, user device 105 may include a processing unit 210, memory 220, a user interface 230, a communication interface 240, and/or an antenna assembly 250.

Processing unit 210 may include one or more microprocessors, application-specific integrated circuits (ASICs), field-programmable gate arrays (FPGAs), or the like. Processing unit 210 may control operation of user device 105 and its components. In one implementation, processing unit 210 may control operation of components of user device 105 in a manner described herein.

Memory 220 may include a random access memory (RAM), a read-only memory (ROM), and/or another type of memory to store data and instructions that may be used by processing unit 210.

User interface 230 may include mechanisms for inputting information to user device 105 and/or for outputting information from user device 105. Examples of input and output mechanisms might include buttons (e.g., control buttons, keys of a keypad, a joystick, etc.) or a touch screen interface to permit data and control commands to be input into user device 105; a speaker to receive electrical signals and output audio signals; a microphone to receive audio signals and output electrical signals; a display to output visual information (e.g., text input into user device 105); a vibrator to cause user device 105 to vibrate; etc.

Communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Additionally, or alternatively, communication interface 240 may include one or more components, such as a line card, that allows user device 105 to connect to another device via a wired connection. Communication interface 240 may connect to antenna assembly 250 for transmission and/or reception of the RF signals.

Antenna assembly 250 may include one or more antennas to transmit and/or receive RF signals over the air. For example, antenna assembly 250 may include a first antenna for communicating with the LTE network and a second antenna for communicating with the WiFi network. Antenna assembly 250 may receive RF signals from communication interface 240 and transmit the RF signals over the air. Antenna assembly 250 may further receive RF signals over the air and provide the RF signals to communication interface 240. In one implementation, for example, communication interface 240 may use antenna assembly 250 to communicate with the LTE network and the WiFi network, and/or devices connected to those networks.

As will be described in detail below, user device 105 may perform certain operations described herein in response to processing unit 210 executing software instructions of an application contained in a computer-readable medium, such as memory 220. A computer-readable medium may be defined as a non-transitory memory device. A memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of user device 105, in other implementations, user device 105 may include fewer components, different components, differently arranged components, or additional components than depicted in FIG. 2. Additionally, or alternatively, one or more components of user device 105 may perform one or more tasks described as being performed by one or more other components of user device 105.

Figure 3:
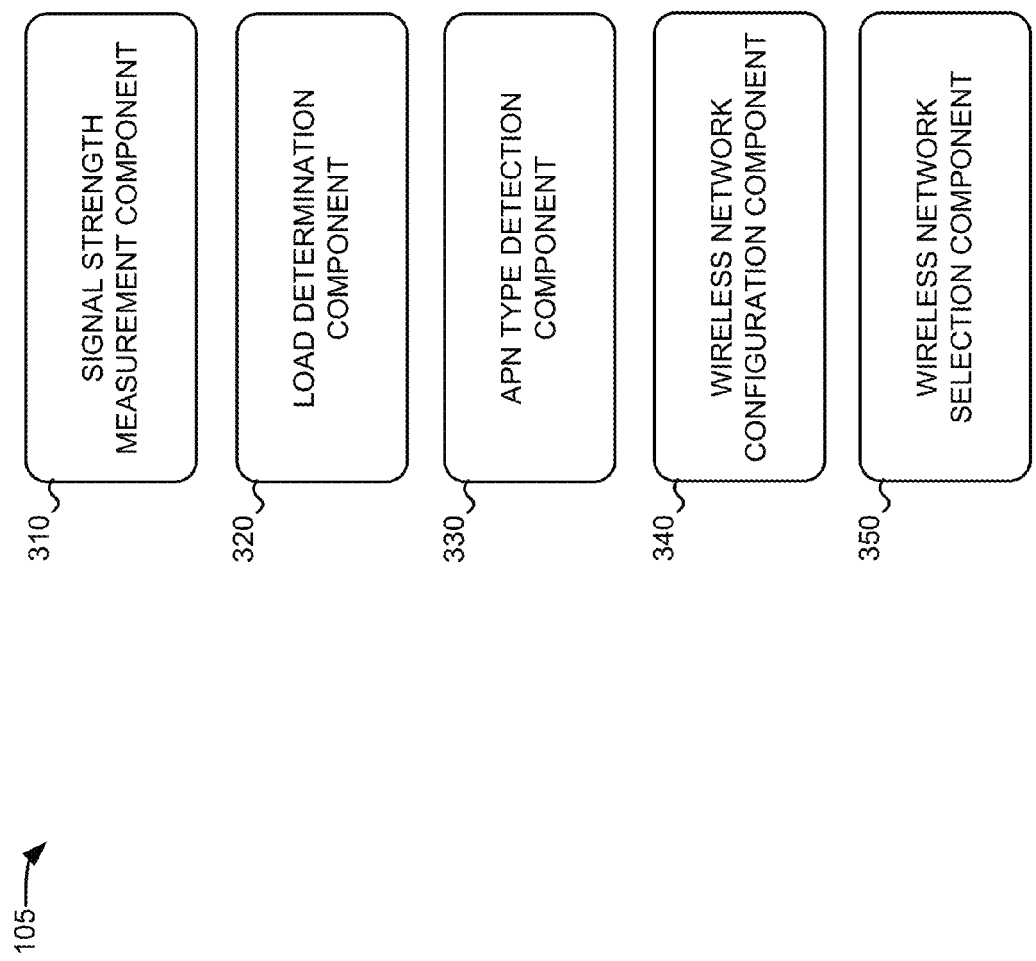
FIG. 3 is a diagram illustrating example functional components that may be associated with the user device of FIG. 1.

FIG. 3 is a diagram illustrating example functional components that may be associated with user device 105. The functional components of FIG. 3 may be implemented via one or more of the components of FIG. 2. For example, the functional components of FIG. 3 may be implemented via processing unit 210 executing instructions stored in memory 220. As shown, user device 105 may include a signal strength measurement component 310, a load determination component 320, an APN type detection component 330, a wireless network configuration component 340, and a wireless network selection component 350.

Signal strength measurement component 310 may include one or more components that allow user device 105 to determine the strength of signals received from different access networks. For example, signal strength measurement component 310 may determine the strength of a signal received from eNode B 110 and the strength of a signal received from access point 140. In one example, signal strength measurement component 310 may measure the strength of a signal received from eNode B 110 and may measure the strength of a signal received from access point 140. Signal strength measurement component 310 may store the determined signal strengths. Signal strength measurement component 310 may make the signal strength determinations on a periodic basis, such as every 5 minutes, 10 minutes, or some other time interval. In one example implementation, signal strength measurement component 310 may allow a user, of user device 105, to configure the time interval.

Load determination component 320 may include one or more components that allow user device 105 to determine the load condition (e.g., the level of congestion) of different access networks. For example, load determination component 320 may determine the load condition of the LTE network and the WiFi network. In one example, load determination component 320 may transmit a first request (e.g., a pilot request) for the load condition of the LTE network to eNode B 110. In response to the first request, eNode B 110 may provide load condition information for the LTE network (e.g., in a pilot response) to user device 105. Additionally, or alternatively, load determination component 320 may transmit a second request (e.g., a pilot request) for the load condition of the WiFi network to access point 140. In response to the second request, access point 140 may provide load condition information for the WiFi network (e.g., in a pilot response) to user device 105.

The load condition information, from eNode B 110 and access point 140, may simply include an indication of whether the corresponding network is congested or not congested, or may include more detailed information regarding the load condition of the corresponding network. For example, a network administrator may set a first threshold value for eNode B 110. The first threshold value may represent a maximum quantity of user devices that can be connected to eNode B 110 before eNode B 110 becomes congested. In response to a pilot request, load determination component 320 may determine the quantity of user devices that are currently connected to eNode B 110 and determine a load condition of the LTE network based on the quantity of user devices currently connected to eNode B 110 and the first threshold value. For example, eNode B 110 may determine the load condition for the LTE network by dividing the quantity of user devices currently connected to eNode B 110 by the first threshold value. Thus, if there are currently 2 user devices connected to eNode B 110 and the threshold value is 10, then eNode B 110 may determine that the load condition of the LTE network is 20%. eNode B 110 may determine the load condition in other ways and/or based on other information. eNode B 110 may provide the determined load condition in the pilot response. Access point 140 may determine the load condition in a similar manner. In either event, load determination component 320 may store the load condition information.

Load determination component 320 may make the load condition determinations on a periodic basis, such as every 5 minutes, 10 minutes, or some other time interval. In one example implementation, load determination component 320 may allow a user, of user device 105, to configure the time interval.

APN type detection component 330 may include one or more components that allow user device 105 to determine the type of APN for a particular network access requested by user device 105. APNs may refer to the use of user device 105 to browse the Internet, place a voice call, or run a specific application. For example, if the user uses user device 105 to browse the Internet, that access may be referred to as an APN Internet. If the user uses user device 105 to place a voice call, that access may be referred to as an APN IMS. If the user uses user device 105 to run an application, that access may be referred to as an APN Application. Thus, the type of action performed by the user, on user device 105, may determine the APN type. APN type detection component 330 may store a table, as described below with respect to FIG. 4, that instructs user device 105 to use a particular access network based on a detected APN type.

Wireless network configuration component 340 may include one or more components that allow a user, of user device 105, to configure access network selection of user device 105. For example, wireless network configuration component 340 may cause one or more interfaces to be presented to the user. Via the one or more interfaces, a user, of user device 105, may configure user device 105 to make an access network selection based on signal strength measurements of the access networks, load conditions of the access networks, an APN type determination, and/or based on other information.

Wireless network selection component 350 may include one or more components that allow user device 105 to select an access network. For example, wireless network selection component 350 may receive information from signal strength measurement component 310, load determination component 320, and/or APN type detection component 330 and may select, based on information set by the user via wireless network configuration network component 340, an access network from the access networks available to user device 105.

Although FIG. 3 shows example functional components of user device 105, in other implementations, user device 105 may include fewer functional components, different functional components, or additional functional components than depicted in FIG. 3. Additionally, or alternatively, one or more functional components of user device 105 may perform one or more tasks described as being performed by one or more other functional components of user device 105.

FIG. 4 is a diagram illustrating an example data structure 400 that may be associated with user device 105. Data structure 400 may be stored, for example, in user device 105 (e.g., in memory 220 (FIG. 2)). Alternatively, some or all of data structure 400 may be stored remotely from user device 105. As shown, data structure 400 may store information in one or more of the following example fields: an APN type field 410, a cellular network field 420, a WiFi network field 430, and an other network field 440.

APN type field 410 may store information identifying a type of an APN relating to a network access. For example, as shown in FIG. 4, APN type field 410 may store information identifying an APN Internet, an APN IMS, and an APN Application. While not shown in FIG. 4, APN type field 410 may additionally, or alternatively, store information identifying particular applications associated with user device 105. Thus, data structure 400 may store network access information on a per application basis.

Cellular network field 420 may store information indicating whether the APN identified in APN type field 410 is to use a cellular network for the network access. In one example, cellular network field 420 may store an indicator, such as a "yes" or "no" indication or a value reflecting one of "yes" or "no."

WiFi network field 430 may store information indicating whether the APN identified in APN type field 410 is to use a WiFi network for the network access. In one example, WiFi network field 420 may store an indicator, such as a "yes" or "no" indication or a value reflecting one of "yes" or "no."

Other network field 440 may store information for another type of network (i.e., other than the cellular network and the WiFi network). Other network field 440 may store information indicating whether the APN identified in APN type field 410 is to use the particular network corresponding to other network field 440. In one implementation, other network field 440 may store an indicator, such as a "yes" or "no" indication or a value reflecting one of "yes" or "no."

Although FIG. 4 shows example fields in data structure 400, in other implementations, data structure 400 may be structured differently or store fewer fields, different fields, or additional fields than illustrated. For example, data structure 400 could, additionally or alternatively, have separate entries for different applications. Thus, data structure 400 could include a first entry for a first application that specifies, for example, that the WiFi network is to be used and a second entry for a second application that specifies that the cellular network is to be used.

Figure 5:
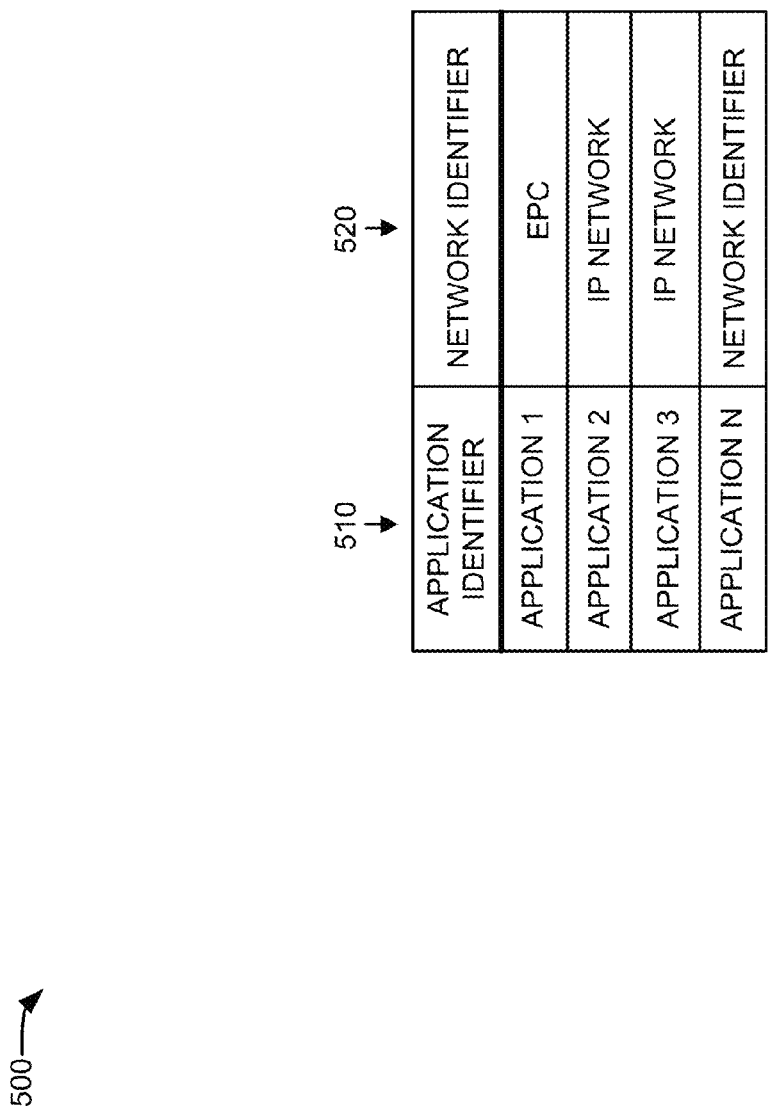
FIG. 5 is a diagram illustrating an example data structure that may be associated with the access point of FIG. 1.

FIG. 5 is a diagram illustrating an example data structure 500 that may be associated with access point 140. Data structure 500 may be stored, for example, in access point 140. Alternatively, some or all of data structure 500 may be stored remotely from access point 140. As shown, data structure 500 may store information in one or more of the following example fields: an application identifier field 510 and a network identifier field 520.

Application identifier field 510 may store information identifying an application being used by user device 105 to access a network. The information may include a sequence of characters that identifies the application or a type of the application. Network identifier field 520 may store information identifying a network to which traffic associated with the application identified in application identifier field 510 is be routed. The information may include a network address (or other information) identifying a device in the appropriate network. For example, where the network is the EPC, network identifier field 520 may store a network address of SGW 115. As another example, where the network is IP network 145, network identifier field 520 may store a network address of an edge router associated with IP network 145.

Although FIG. 5 shows example fields in data structure 500, in other implementations, data structure 500 may be structured differently or store fewer fields, different fields, or additional fields than illustrated.

Figure 6:
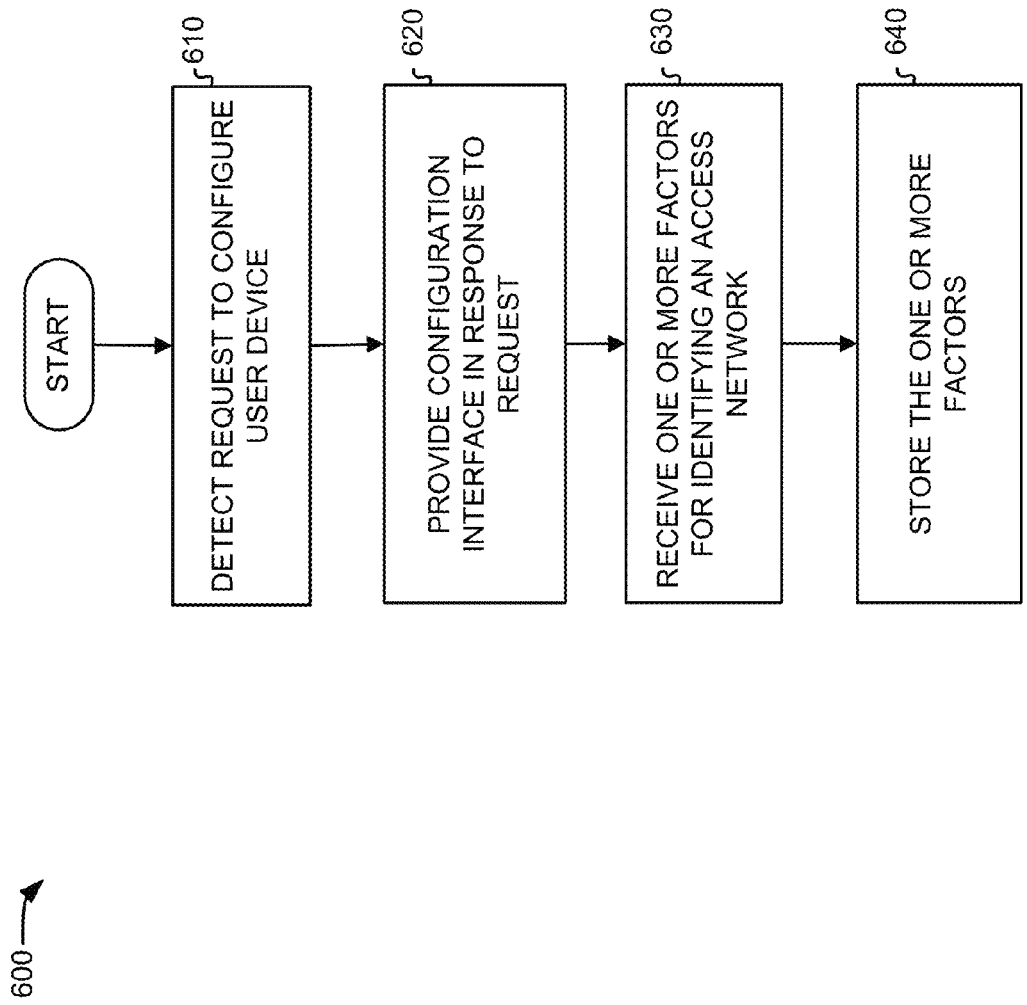
FIG. 6 is a flow chart illustrating an example process for configuring a user device for selecting an access network.

FIG. 6 is a flow chart illustrating an example process 600 for configuring user device 105 for selecting an access network. Process 600 may be performed, for example, by user device 105. In other implementations, some or all of process 600 may be performed by another device or group of devices, including or excluding user device 105.

Process 600 may include detecting a request to configure a user device (block 610). For example, a user, of user device 105, may initiate an application stored on user device 105 to initiate configuration of user device 105. User device 105 (e.g. wireless network configuration component 340) may detect the initiation of the application. The user may alternatively initiate configuration of user device 105 in other ways (e.g., by selecting a menu item).

Process 600 may further include providing a configuration interface to the user (block 620). For example, wireless network configuration component 340 may, in response to detecting the request to configure user device 105, provide an interface to allow the user to specify factors that are to be considered in determining the access network that user device 105 is to use in certain situations.

Figure 7:
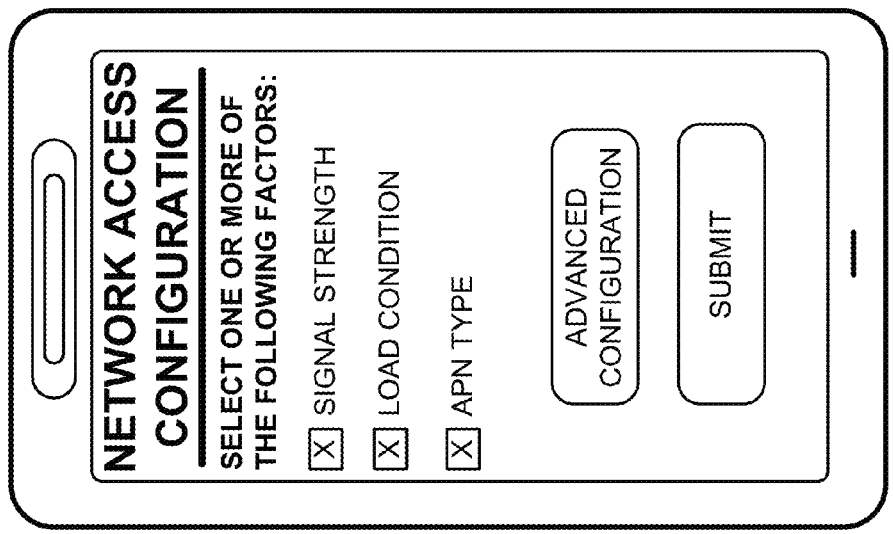
FIG. 7 is a diagram of an example interface that may be provided to a user in connection with the process of FIG. 6.

FIG. 7 is a diagram of an example interface 700 that may be provided to the user. As shown, interface 700 may allow the user to select whether the access network should be selected based on one or more of the following example factors: the signal strength of the access networks, the load condition of the access networks, and/or an APN type. In the event that the user selects the APN type, interface 700 may provide one or more additional interfaces that allow the user to populate data structure 400. Alternatively, data structure 400 may be received from a service provider. In this situation, wireless network component 340 may provide one or more interfaces that allow the user to adjust the entries in data structure 400. As further shown in FIG. 7, interface 700 may allow the user to provide additional information for configuring network access of user device 105 (e.g., though selection of the "advanced configuration" button). As one example, the advanced configuration button may allow the user to specify that a particular access network should be used any time the access network is available. For example, the user may specify that any time that the user's home wireless network is available, user device 105 is to select that network as the access network. Additionally, or alternatively, the user may specify that any time that the user's home wireless network is available, user device 105 is to select that network as the access network, unless the user's home wireless network does not meet certain criteria (e.g., based on signal strength, load condition, and/or other factors).

Returning to FIG. 6, process 600 may include receiving one or more factors for identifying an access network (block 630). For example, wireless network configuration component 340 may receive, in response to the user selecting the submit button in interface 700 (FIG. 7), information identifying one or more factors that the user has selected to be used to identify which access network is to be used for a particular network access request.

Process 600 may further include storing information identifying the one or more factors (block 640). For example, wireless network configuration component 340 may store information identifying the one or more factors, selected by the user, in a memory, such as memory 220.

Although FIG. 6 shows example blocks of process 600, in other implementations, process 600 may include fewer blocks, different blocks, differently arranged blocks, or additional blocks than illustrated. Moreover, one or more of the blocks of process 600 may be performed in parallel.

Figure 8:
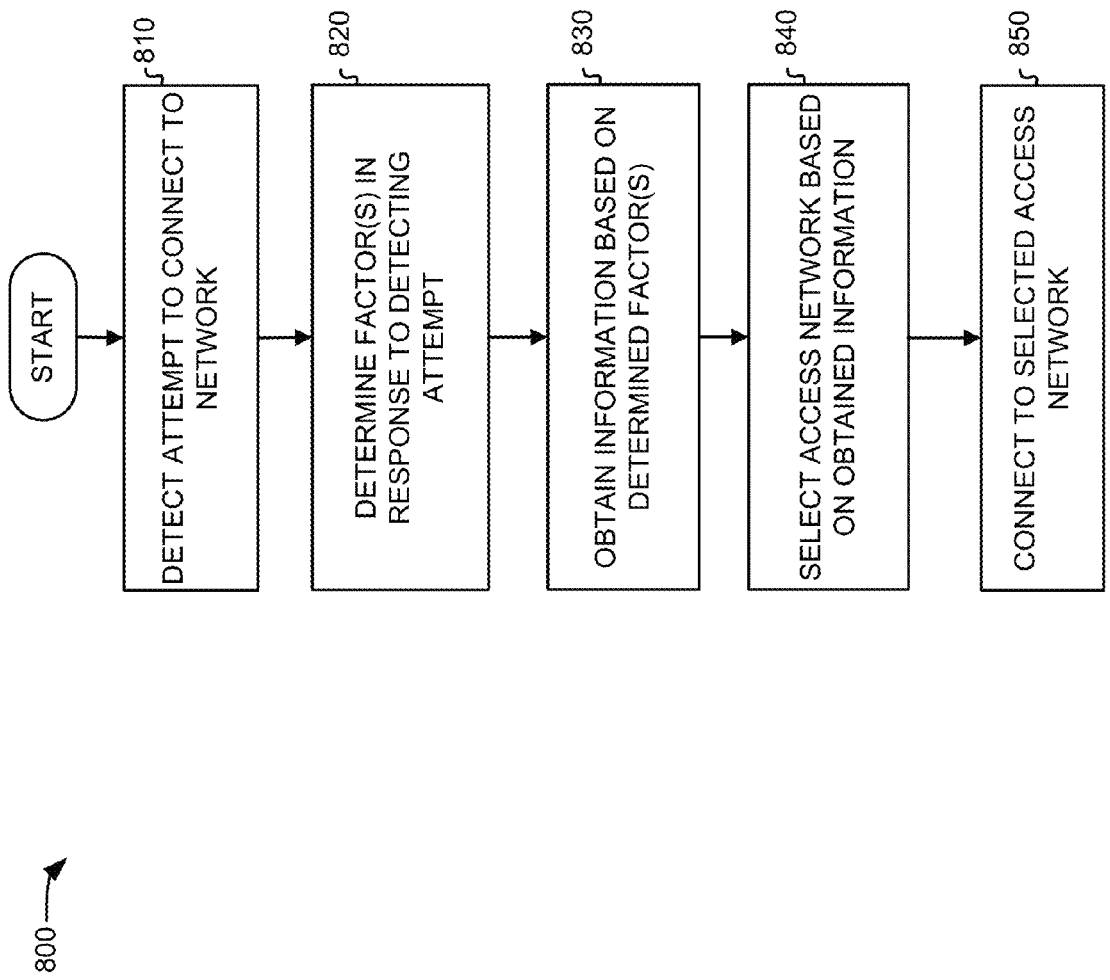
FIG. 8 is a flow chart illustrating an example process for connecting to an access network.

FIG. 8 is a flow chart illustrating an example process 800 for connecting to an access network. Process 800 may be performed, for example, by user device 105. In other implementations, some or all of process 800 may be performed by another device or a group of devices, including or excluding user device 105.

Process 800 may include detecting an attempt to connect to a network (block 810). For example, a user, of user device 105, may initiate an application stored on user device 105. The application may attempt to access a network either automatically or in response to a command from the user. The access attempt may include the generation of a request to access a network. User device 105 (e.g., wireless network selection component 350) may detect the attempt to access a network.

Process 800 may further include determining the factor(s) to be used in identifying an access network (block 820). For example, wireless network selection component 350 may, in response to detecting the network access attempt, identify the one or more factors upon which the decision, as to which access network to use, may be based. Wireless network selection component 350 may identify the one or more factors based on the information stored by wireless network configuration component 340, as described above with respect to FIG. 6. For example, wireless network selection component 350 may determine that the identification of the access network is to be based on one or more of the signal strength of the access networks, the load condition of the access networks, the APN type, and/or other factors.

Process 800 may include obtaining information based on the determined factor(s) (block 830). For example, when the factor(s) include signal strength, wireless network selection component 350 may obtain a measurement of the signal strength of the available access networks (e.g., from signal strength measurement component 310). Signal strength measurement component 310 may make the signal strength measurements in response to the network access attempt. Alternatively, signal strength measurement component 310 may make the signal strength measurements on a continuous basis and simply provide the most recent measurements to wireless network selection component 350.

When the factor(s) include load condition, wireless network selection component 350 may obtain the load condition of the available access networks (e.g., from load determination component 320). Load determination component 320 may send a pilot request to the available access networks to obtain the load conditions of the access networks. Load determination component 320 may send the pilot request in response to the network access attempt. Alternatively, load determination component 320 may send the pilot request on a continuous basis and simply provide the most recent load conditions, received from the available access networks, to wireless network selection component 350.

When the factor(s) include APN type, wireless network selection component 350 may obtain the APN type from APN type detection component 330. APN type detection component 330 may detect the APN type associated with the network access attempt.

Process 800 may additionally include selecting an access network based on the obtained information (block 840). For example, wireless network selection component 350 may select an access network based on the obtained signal strengths, load conditions, APN types, and/or other factors. Further details regarding blocks 830 and 840 are provided below with respect to FIGS. 9-12.

Process 800 may include connecting to the selected access network (block 850). For example, when the LTE network is selected, user device 105 may establish a connection to eNode B 110 and send data to eNode B 110. eNode B 110 may forward the data toward the appropriate destination (e.g., the IMS core, IP network 145, or another destination). When the WiFi network is selected, user device 105 may connect to access point 140 and send data to access point 140. Access point 140 may forward the data toward the appropriate destination (e.g., the EPC, IP network 145, or another destination).

Although FIG. 8 shows example blocks of process 800, in other implementations, process 800 may include fewer blocks, different blocks, differently arranged blocks, or additional blocks than illustrated. Moreover, one or more of the blocks of process 800 may be performed in parallel.

Figure 9:
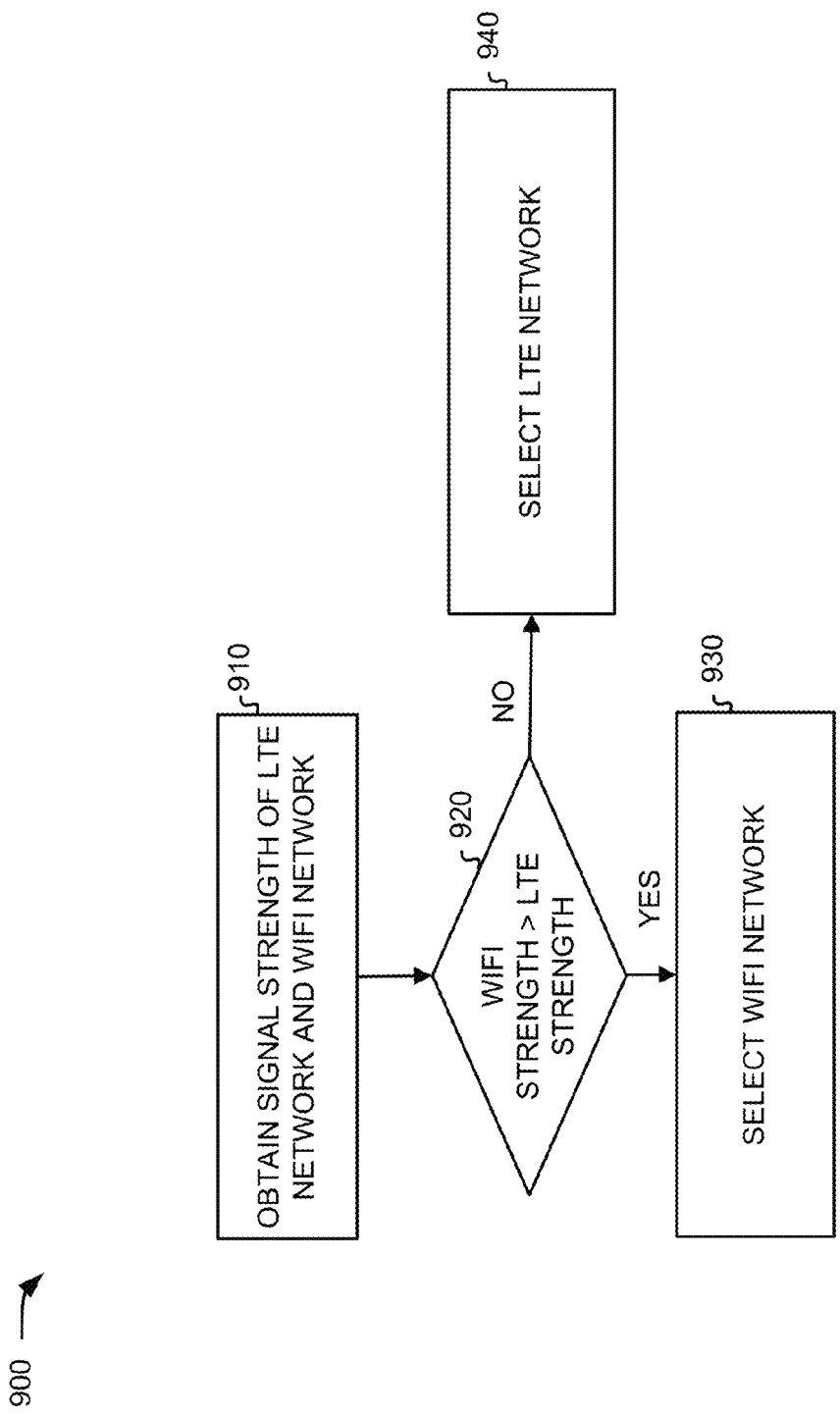

FIG. 9 is a flow chart illustrating an example process 900 that may correspond to blocks 830 and 840 of FIG. 8. As illustrated, process 900 may include obtaining signal strength of the LTE network and the WiFi network (block 910). For example, signal strength measurement component 310 may measure the signal strength of signals received from eNode B 110 to obtain the signal strength of the LTE network. Signal strength measurement component 310 may further measure the signal strength of signals received from access point 140 to obtain the signal strength of the WiFi network.

Process 900 may further include determining whether the signal strength of the WiFi network is greater than the signal strength of the LTE network (block 920). For example, wireless network selection component 350 may receive the measured signal strengths from signal strength measurement component 310 and compare the measured signal strengths of the LTE network and the WiFi network to determine which signal strength is greater.

When the signal strength of the WiFi network is greater than the signal strength of the LTE network (block 920—YES), process 900 may include selecting the WiFi network (block 930). For example, wireless network selection component 350 may select the WiFi network when the signal strength of that network exceeds the signal strength of the LTE network.

When the signal strength of the WiFi network is less than the signal strength of the LTE network (block 920—NO), process 900 may include selecting the LTE network (block 940). For example, wireless network selection component 350 may select the LTE network when the signal strength of that network exceeds the signal strength of the WiFi network.

Although FIG. 9 shows example blocks of process 900, in other implementations, process 900 may include fewer blocks, different blocks, differently arranged blocks, or additional blocks than illustrated. Moreover, one or more of the blocks of process 900 may be performed in parallel.

Figure 10:
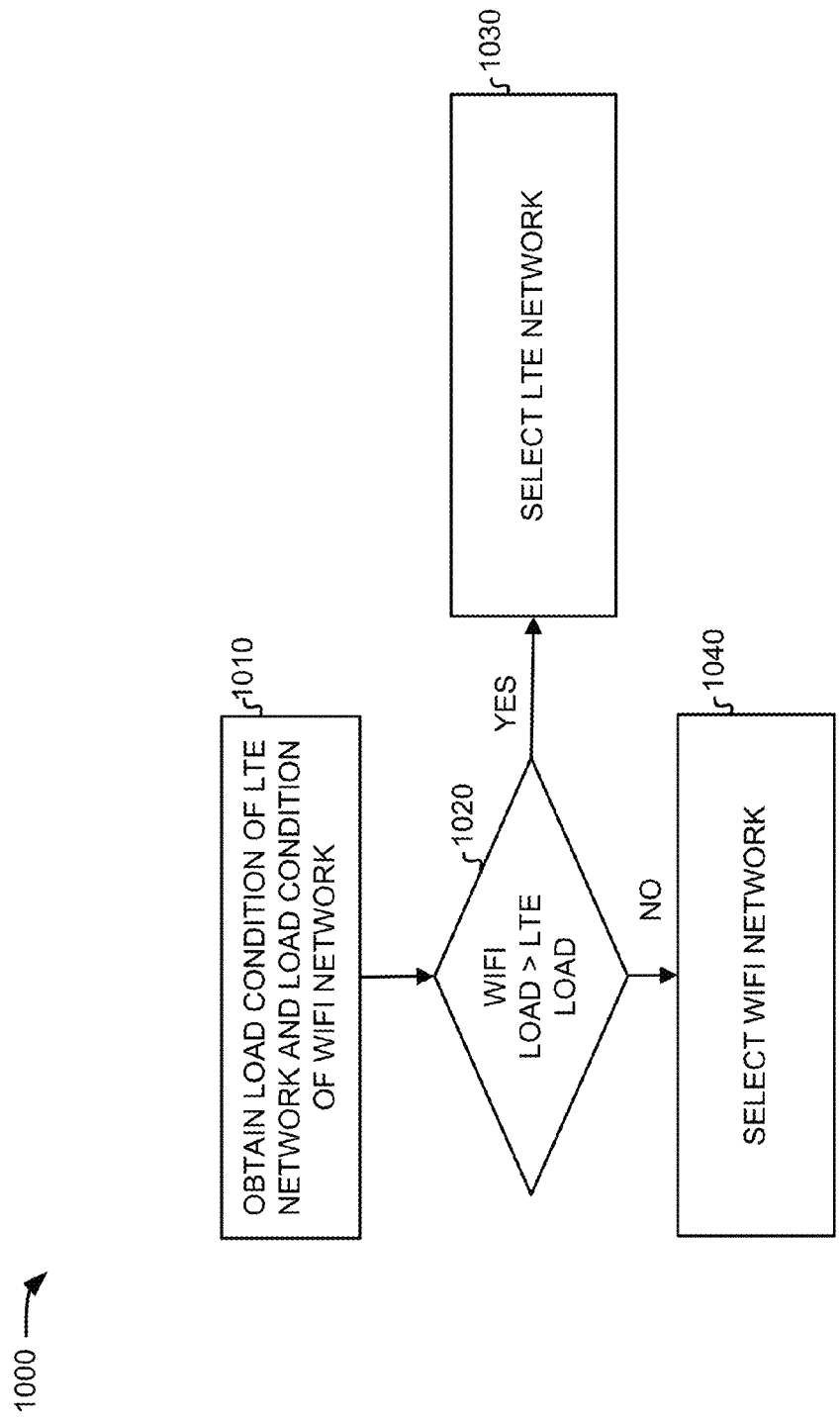

FIG. 10 is a flow chart illustrating an example process 1000 that may correspond to blocks 830 and 840 of FIG. 8. As illustrated, process 1000 may include obtaining the load condition of the LTE network and the WiFi network (block 1010). For example, load determination component 320 may send a first pilot request to eNode B 110. In response, eNode B 110 may send a first pilot response to user device 105 (e.g., to load determination component 320), which includes an indication of the load condition of the LTE network. In addition, load determination component 320 may send a second pilot request to access point 140. In response, access point 140 may send a second pilot response to user device 105 (e.g., to load determination component 320), which includes an indication of the load condition of the WiFi network.

Process 1000 may further include determining whether the load of the WiFi network is greater than the load of the LTE network (block 1020). For example, wireless network selection component 350 may receive the load conditions from load determination component 320 and compare the load condition of the LTE network and the WiFi network to determine which network is more congested.

When the load of the WiFi network is greater than the load of the LTE network (block 1020—YES), process 1000 may include selecting the LTE network (block 1030). For example, wireless network selection component 350 may select the LTE network when the load of the WiFi network is greater than the load of the LTE network.

When the load of the WiFi network is less than the load of LTE network (block 1020—NO), process 1000 may include selecting the WiFi network (block 1040). For example, wireless network selection component 350 may select the WiFi network when the load of that network is less than the load of the LTE network.

Although FIG. 10 shows example blocks of process 1000, in other implementations, process 1000 may include fewer blocks, different blocks, differently arranged blocks, or additional blocks than illustrated. Moreover, one or more of the blocks of process 1000 may be performed in parallel.

Figure 11:
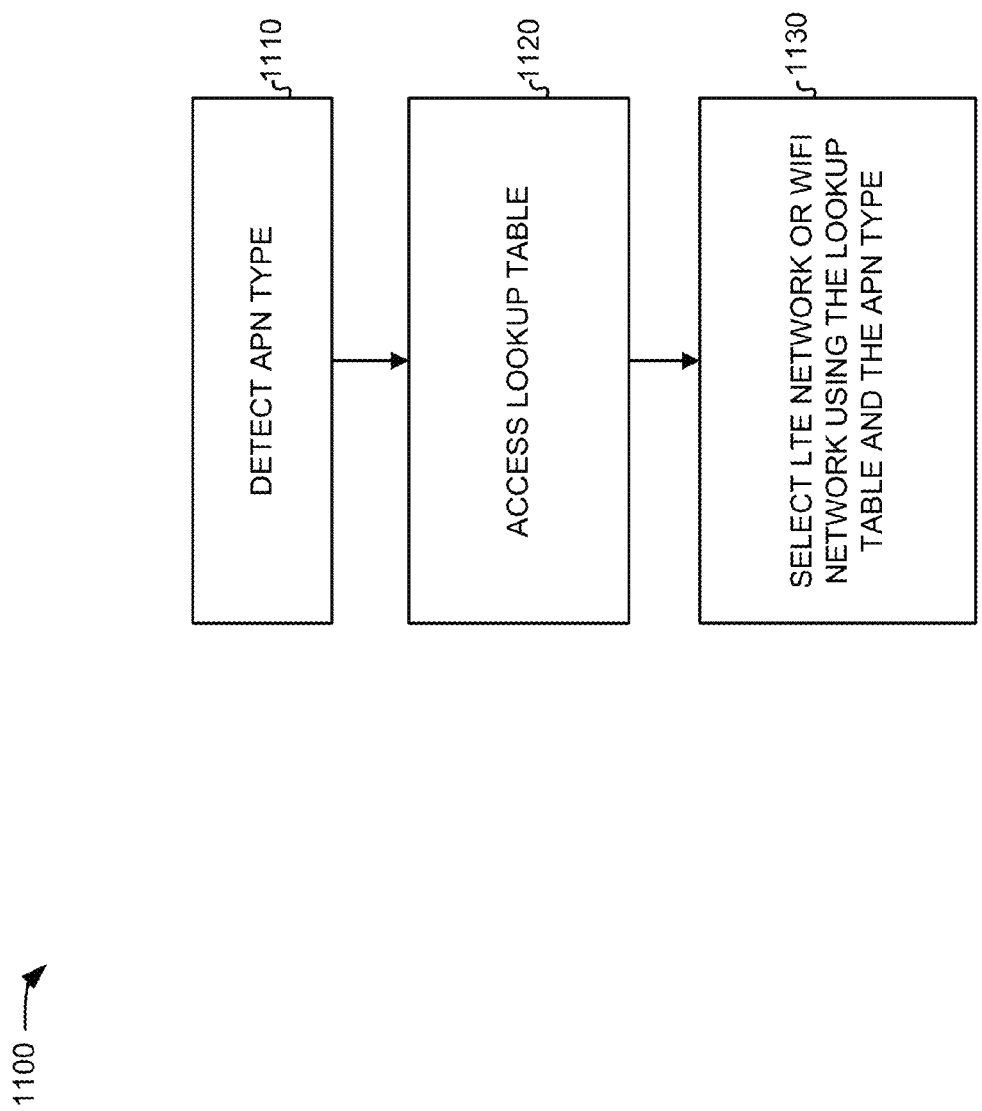

FIG. 11 is a flow chart illustrating an example process 1100 that may correspond to blocks 830 and 840 of FIG. 8. As illustrated, process 1100 may include detecting an APN type (block 1110). For example, APN type detection component 330 may detect the type of network access user device 105 is performing. For example, if the user, of user device 105, desires to use user device 105 to browse the Internet, APN type detection component 330 may detect the type of APN as APN Internet. If the user, of user device 105, desires to use user device 105 to place a voice call, APN type detection component 330 may detect the type of APN as APN IMS. If the user, of user device 105, desires to use user device 105 to run an application, APN type detection component 330 may detect the type of APN as APN Application.

Process 1100 may further include accessing a lookup table (block 1120). For example, wireless network selection component 350 may receive the APN type from APN type detection component 330 and access a lookup table, such as data structure 400, that may be used to select an access network.

Process 1100 may also include selecting the LTE network or the WiFi network using the lookup table and the APN type (block 1130). For example, wireless network selection component 350 may access a lookup table, using the detected APN type as a key, to identify the appropriate access network. As one example and with reference to data structure 400 (FIG. 4), if the detected APN type is APN Internet, wireless network selection component 350 may select the WiFI network. If the detected APN type is APN IMS, wireless network selection component 350 may select the LTE network. If the detected APN type is APN Application, wireless network selection component 350 may select the WiFI network.

Although FIG. 11 shows example blocks of process 1100, in other implementations, process 1100 may include fewer blocks, different blocks, differently arranged blocks, or additional blocks than illustrated. Moreover, one or more of the blocks of process 1100 may be performed in parallel.

FIG. 12 is a flow chart illustrating an example process 1200 that may correspond to blocks 830 and 840 of FIG. 8. As illustrated, process 1200 may include obtaining a measure of the signal strength of the LTE network and the WiFi network (block 1210). For example, wireless network selection component 350 may obtain the measures of signal strength of the LTE network and the WiFi network, as set forth above with respect to block 910 of FIG. 9. Process 1200 may further include obtaining the load conditions of the LTE network and the WiFi network (block 1220). For example, wireless network selection component 350 may obtain the load conditions (e.g., the levels of congestion) of the LTE network and the WiFi network, as set forth above with respect to block 1010 of FIG. 10. Process 1200 may further include detecting an APN type (block 1230) and accessing a lookup table (block 1240). For example, wireless network selection component 350 may detect the APN type and access a lookup table, such as data structure 400, as set forth above with respect to blocks 1110 and 1120 of FIG. 11.

Process 1200 may further include selecting the LTE network or the WiFi network based on two or more of the measures of signal strength of the LTE and WiFi networks, the load conditions of the LTE and WiFi networks, or the APN type and the lookup table (block 1130). For example, wireless network selection component 350 may use two or more of these factors (i.e., the measures of signal strength of the LTE and WiFi networks, the load conditions of the LTE and WiFi networks, or the information from data structure 400) to select either the LTE network or the WiFI network. In one example, wireless network selection component 350 may combine these factors, for the LTE network and the WiFi network, in a number of different ways to determine which access network to select. For example, wireless network selection component 350 may assign a first weight to the signal strength factor, a second weight to the load factor, and a third weight to the APN factor. Wireless network selection component 350 may select the LTE network or the WiFi network based on values of each of these factors and their assigned weights.

As a second example, wireless network selection component 350 may determine whether the signal strength factor of the LTE network and the signal strength factor of the WiFi network are above a signal strength threshold (e.g., a hysteresis limit). The signal strength threshold may correspond to a minimum signal strength that would be acceptable for a network connection. Thus, for example, if the signal strength factor of the LTE network is below the signal strength threshold, wireless network selection component 350 may select the WiFi network, regardless of the APN factor for the WiFi network and as long as the load factor for the WiFi network is within an acceptable range. Similarly, wireless network selection component 350 may determine whether the load factor of the LTE network and the load factor of the WiFi network are above a load threshold (e.g., a hysteresis limit). The load threshold may correspond to a maximum acceptable load for an access network. Thus, for example, if the load factor for the LTE network is above the load threshold, wireless network selection component 350 may select the WiFi network, regardless of the APN factor for the WiFi network and as long as the signal strength factor for the WiFi network is within an acceptable range.

As a third example, wireless network selection component 350 may base the selection of the LTE network or the WiFi network primarily on the APN factor, provided that the signal strength factor and the load factor, for the access network, identified using the APN factor, are within acceptable ranges.

Although FIG. 12 shows example blocks of process 1200, in other implementations, process 1200 may include fewer blocks, different blocks, differently arranged blocks, or additional blocks than illustrated. Moreover, one or more of the blocks of process 1200 may be performed in parallel.

Figure 13A:
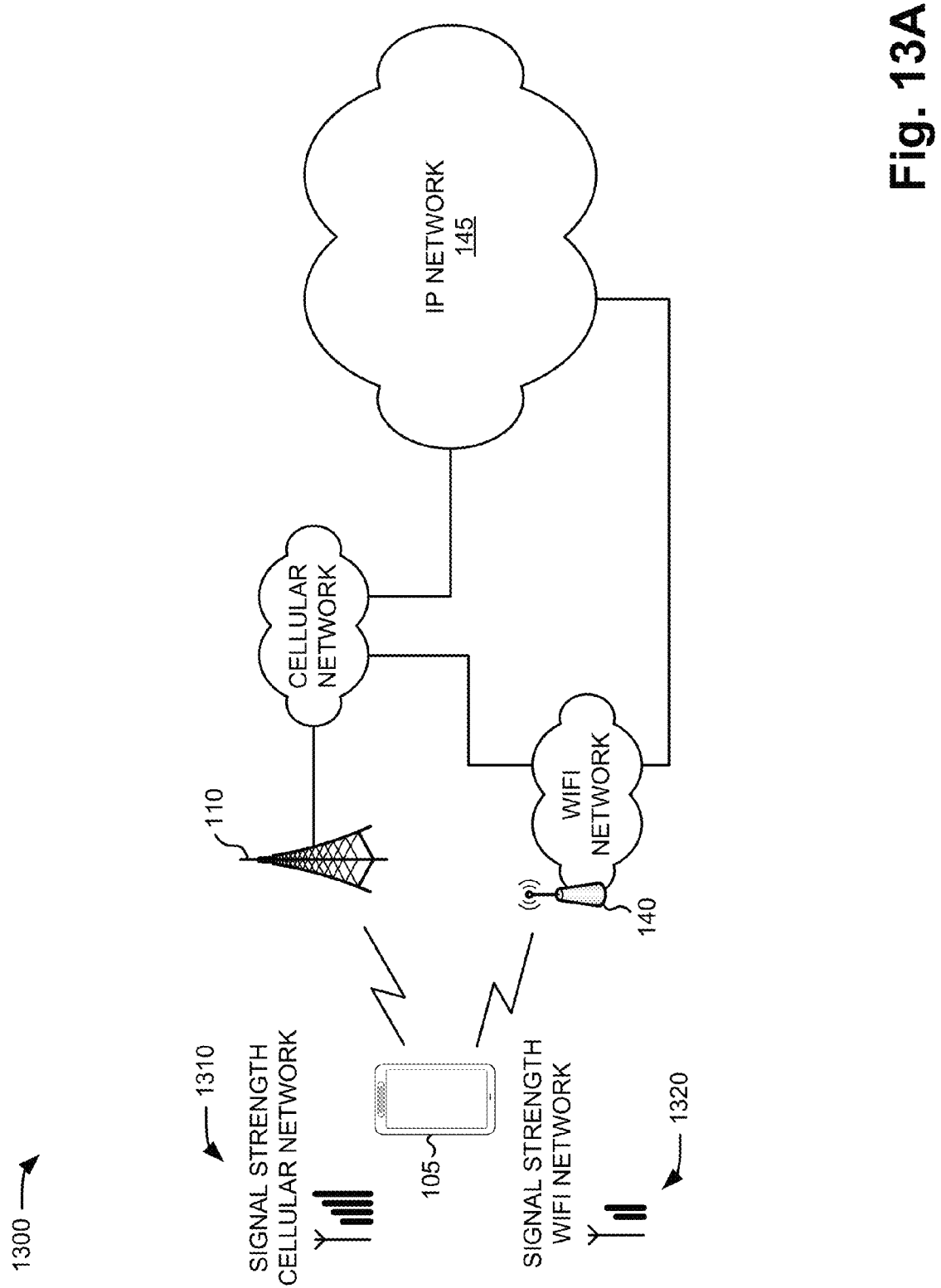
FIGS. 13A-15C are examples of the processes described in FIGS. 8-11.
Figure 13B:
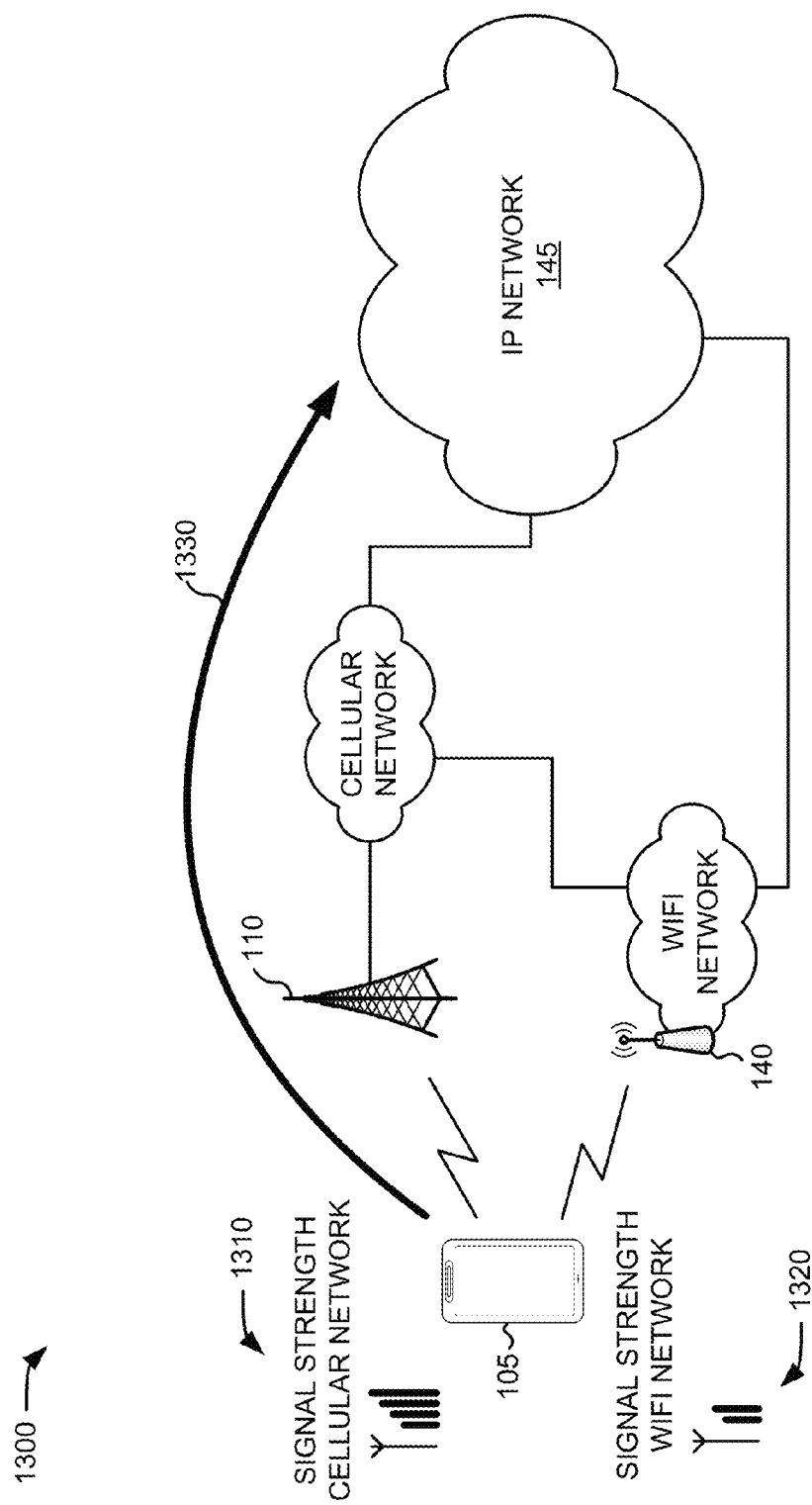

FIGS. 13A and 13B provide an example 1300 of selecting an access network based on signal strength measurements. In example 1300, assume that a user, of user device 105, is attempting to use user device 105 to send data to a device in IP network 145. As shown in FIG. 13A, user device 105 may measure a signal strength 1310 of a cellular network and a signal strength 1320 of a WiFi network that are available to user device 105. In example 1300, assume that signal strength 1310 is greater than signal strength 1320. Thus, user device 105 may determine that the signal strength from the cellular network is greater than the signal strength of the WiFi network. User device 105 may then transmit the data to IP network 145 through the cellular network (e.g., through eNode B 110), as shown by element 1330 in FIG. 13B.

Figure 14A:
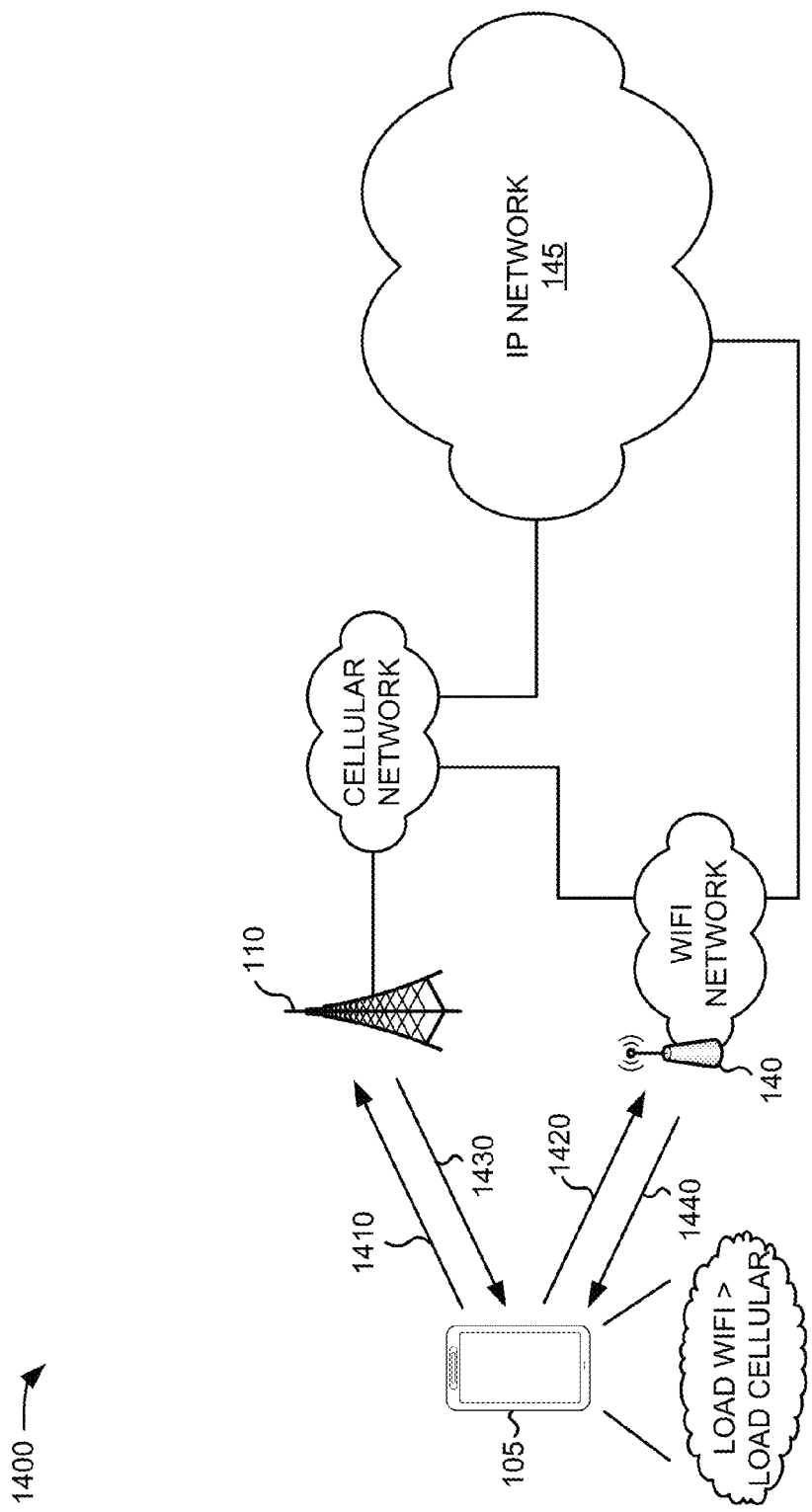
Figure 14B:
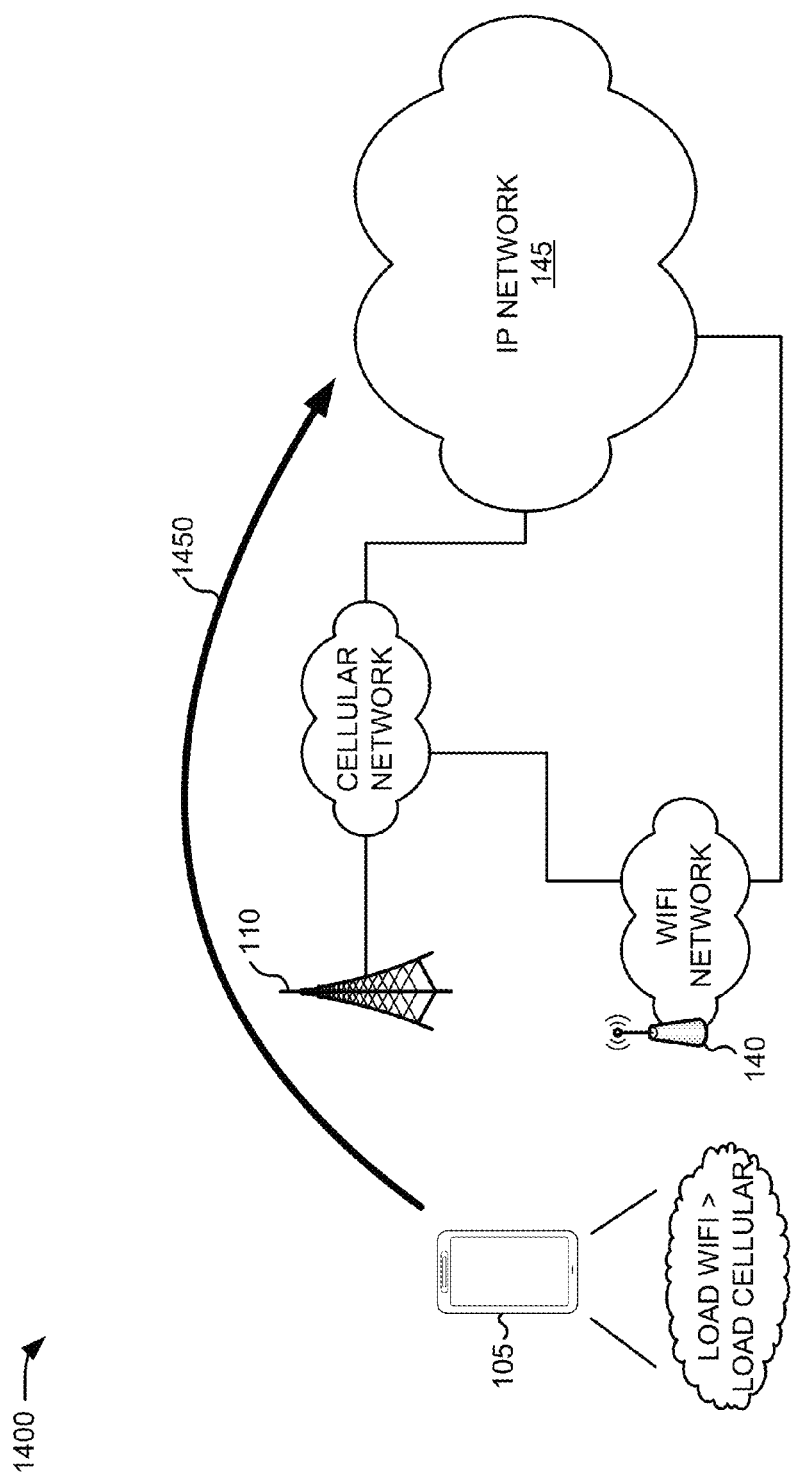

FIGS. 14A and 14B provide an example 1400 of selecting an access network based on the loads of the available access networks. In example 1400, assume that a user, of user device 105, is attempting to use user device 105 to send data to a device in IP network 145. As shown in FIG. 14A, user device 105 may send a pilot request 1410 to eNode B 110 and a pilot request 1420 to access point 140. eNode B 110 may send a pilot response 1430 to user device 105, indicating the load of the cellular network. Access point 140 may send a pilot response 1440 to user device 105, indicating the load of the WiFi network.

In example 1400, assume that the load of the WiFi network is greater than the load of the cellular network. Thus, user device 105 may transmit the data to IP network 145 through the cellular network (e.g., through eNode B 110), as shown by element 1450 in FIG. 14B.

Figure 15A:
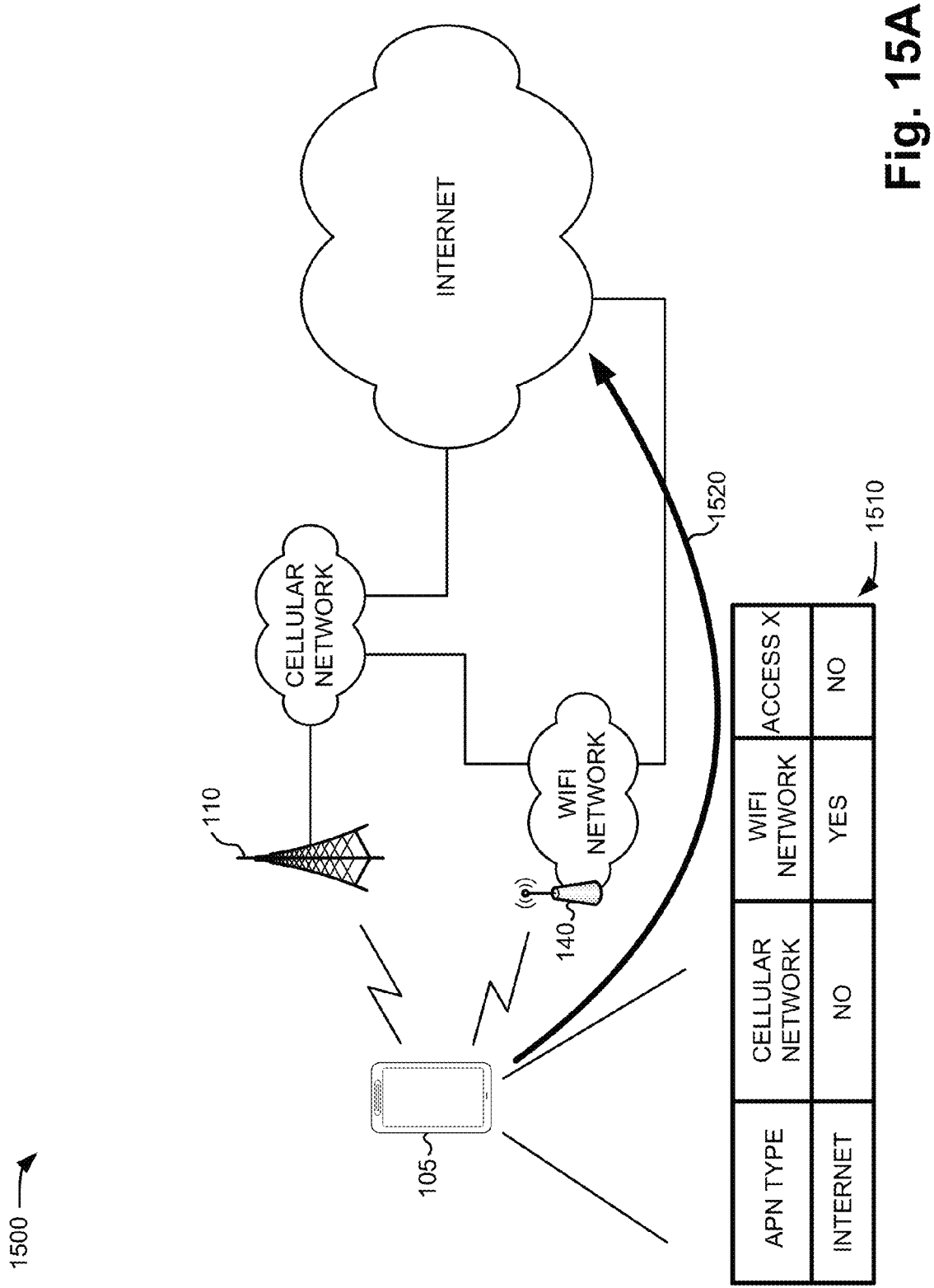

FIG. 15A provides an example 1500 of selecting an access network based on an APN type. In example 1500, assume that user device 105 includes a data structure 1510, which indicates that when the user uses user device 105 to browse the Internet, user device 105 is to select the WiFi network. Assume further that the user is attempting to use user device 105 to browse the Internet. As shown in FIG. 15A, user device 105 may determine the APN type as APN Internet. Based on data structure 1510, user device 105 may determine that the WiFi network should be selected. Thereafter, user device 105 may access the Internet through the WiFi network (e.g., through access point 140), as shown by element 1520 in FIG. 15A.

Figure 15B:
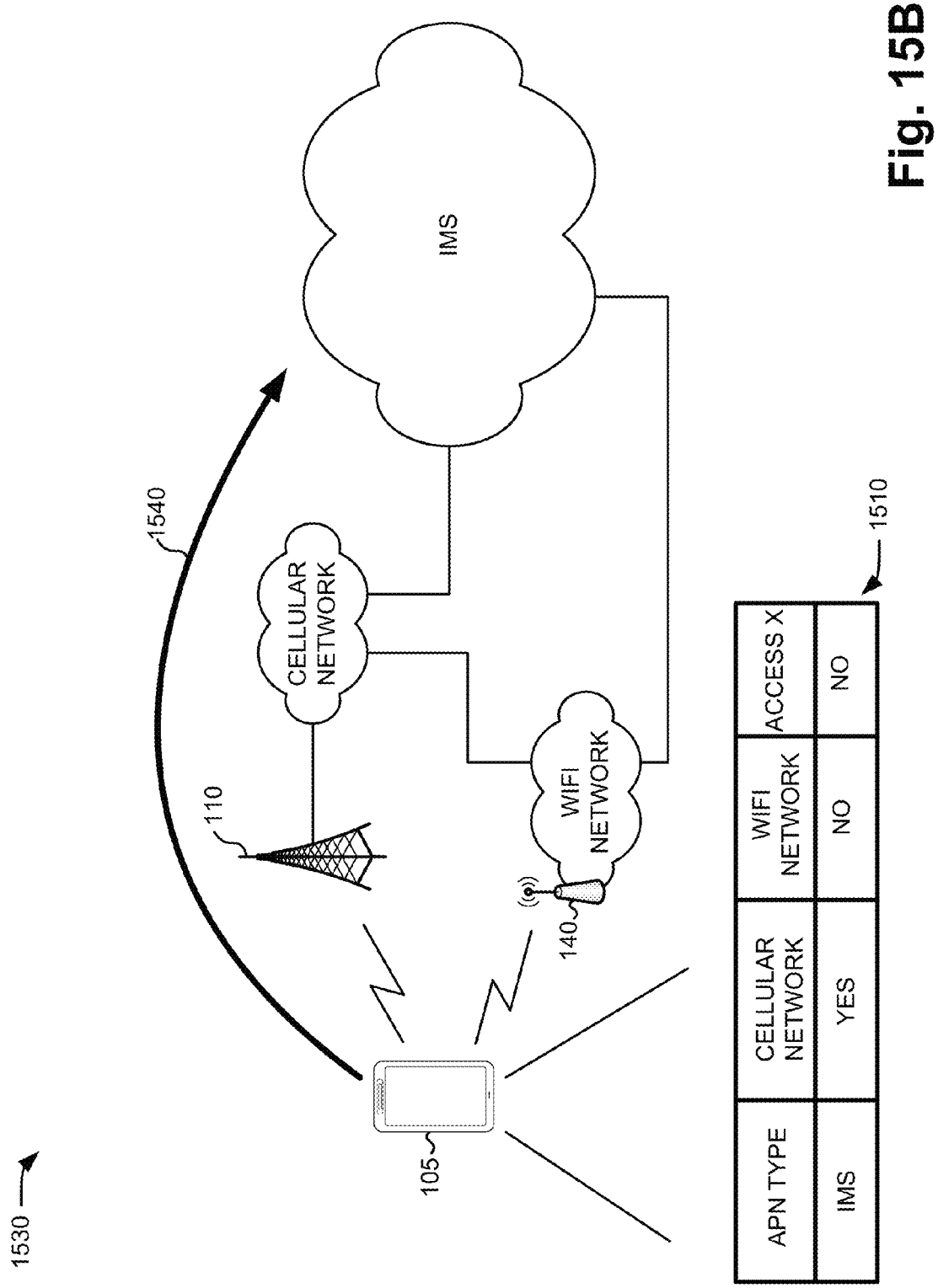

FIG. 15B provides a second example 1530 of selecting an access network based on an APN type. In example 1530, assume that user device 105 includes data structure 1510, which indicates that when the user uses user device 105 to place a call, user device 105 is to select the cellular network. Assume further that the user is attempting to use user device 105 to place a call. As shown in FIG. 15B, user device 105 may determine the APN type as APN IMS. Based on data structure 1510, user device 105 may determine that the cellular network should be selected. Thereafter, user device 105 may place the call through the cellular network (e.g., through eNode B 110), as shown by element 1540 in FIG. 15B.

Figure 15C:
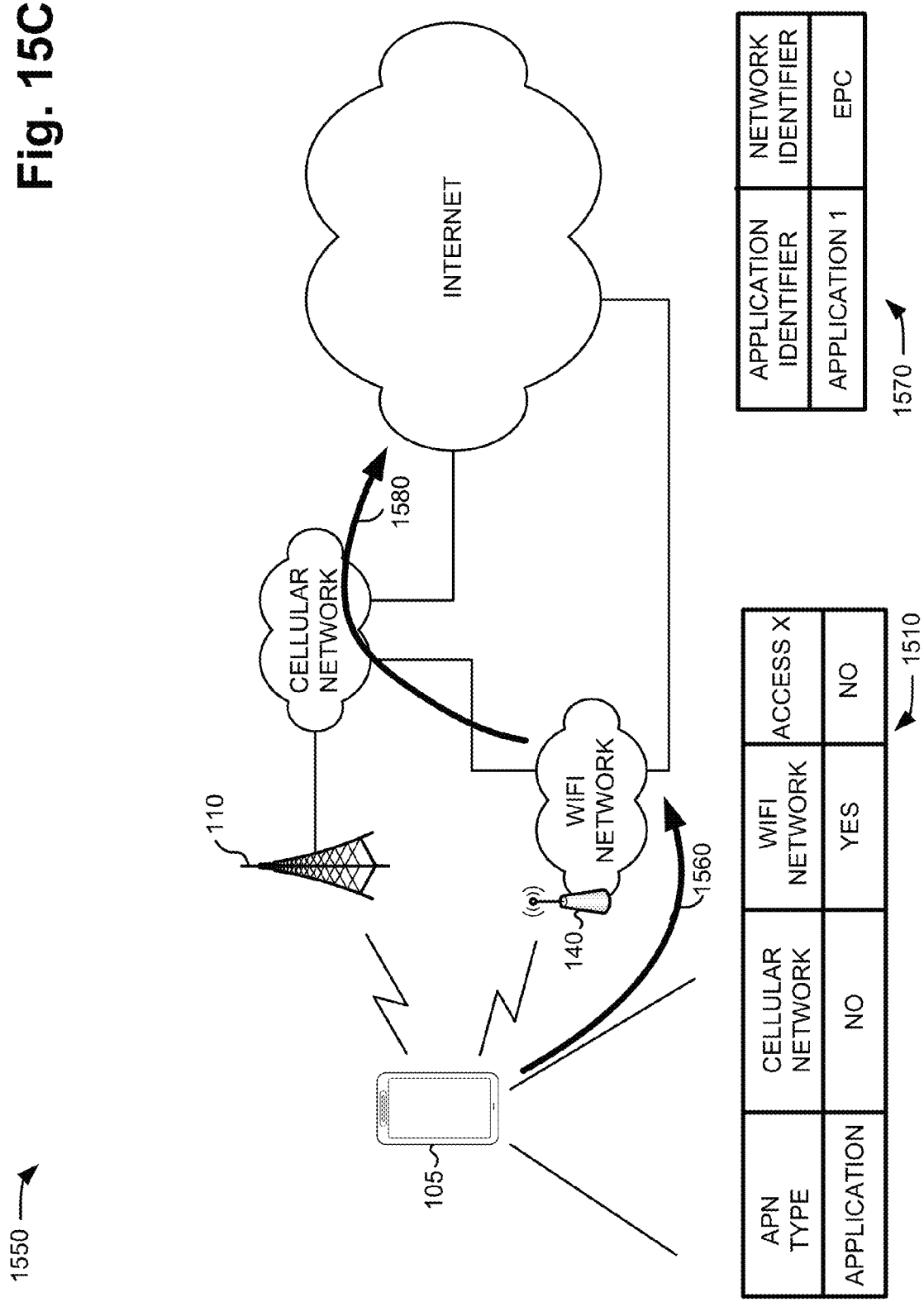

FIG. 15C provides a third example 1550 of selecting an access network based on an APN type. In example 1550, assume that user device 105 includes data structure 1510, which indicates that when the user runs an application, user device 105 is to select the WiFi network. Assume further that the user has initiated an application (referred to as "application 1") on user device 105 that causes a connection to a device via the Internet. As shown in FIG. 15C, user device 105 may determine the APN type as APN Application. Based on data structure 1510, user device 105 may determine that the WiFi network should be selected. Thereafter, user device 105 may send data to the WiFi network (e.g., through access point 140), as shown by element 1560 in FIG. 15C. The data may include information identifying application 1.

Assume further that access point 140 is associated with a data structure 1570 that indicates that if data is received from application 1, that data is to be routed to the cellular network. For example, application 1 may be a walled garden application. Thus, in example 1550, access point 140 may receive the data from user device 105 and route the data to the Internet through the cellular network, as shown by element 1580 in FIG. 15C.

The foregoing description of implementations provides illustration and description, but is not intended to be exhaustive or to limit the invention to the precise form disclosed. Modifications and variations are possible in light of the above teachings or may be acquired from practice of the invention. For example, while the description above focused on selection between a cellular network and a WiFi network, it will be appreciated that implementations described herein are not so limited. For example, the selection of which access network to use for a network connection may include selections between the same type of wireless networks (e.g., between a first WiFi network and a second WiFi network), selections between different wireless networks that are of the same type (e.g., selections between a first type of cellular network and a second, different type of cellular network), and/or even selections between wireless and wired connections.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a computer readable medium).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a user device and from a user of the user device, configuration information identifying one or more factors relating to selecting an access network;
detecting, by the user device, an attempt to access a wireless network of a plurality of wireless networks available to the user device;
identifying, by the user device, the configuration information identifying the one or more factors, based on detecting the attempt;
obtaining, by the user device and based on the configuration information identifying the one or more factors, at least one of:
a signal strength measurement of each wireless network of the plurality of wireless networks, or
information identifying a level of congestion of each wireless network of the plurality of wireless networks;
accessing, by the user device, a data structure using information identifying an access point name (APN) type associated with the detected attempt,
the data structure storing information identifying a plurality of APN types and information identifying a respective wireless network, of the plurality of wireless networks, associated with each of the plurality of APN types,
the plurality of APN types relating to browsing the Internet, placing a voice call, and running an application,
the plurality of APN types including the APN type associated with the detected attempt;
selecting, by the user device, one wireless network, of the plurality of wireless networks, based on accessing the data structure and the at least one of the signal strength measurement of each wireless network of the plurality of wireless networks, or the information identifying the level of congestion of each wireless network of the plurality of wireless networks; and
connecting, by the user device, to the one wireless network.

2. The method of claim 1, where the obtaining includes:
obtaining the signal strength measurement of each wireless network of the plurality of wireless networks, and
where the selecting includes:
comparing the obtained signal strength measurement of each wireless network of the plurality of wireless networks, and
selecting, based on the comparing, the one wireless network, of the plurality of wireless networks, that is associated with a strongest signal strength measurement of the obtained signal strength measurements.

3. The method of claim 1, where the obtaining includes:
obtaining the information identifying the level of congestion of each wireless network of the plurality of wireless networks, and
where the obtaining the information identifying the level of congestion includes:
sending a request to a respective device associated with each wireless network of the plurality of wireless networks, and
receiving, based on sending the request to the device associated with each wireless network of the plurality of wireless networks, a response from the respective device associated with each wireless network of the plurality of wireless networks,
each response including the information identifying the level of congestion of the associated wireless network.

4. The method of claim 3, where the selecting includes:
comparing information identifying levels of congestion of the plurality of wireless networks, and
selecting, based on the comparing, the one wireless network, of the plurality of wireless networks, that is associated with a smallest level of congestion of the information identifying the levels of congestion.

5. The method of claim 1, where the obtaining includes:
obtaining the information identifying the APN type, and
where the obtaining the information identifying the APN type includes:
identifying an action performed by the user device,
where the action relates to browsing the Internet, placing the voice call, or running the application, and
identifying the APN type based on the identified action.

6. The method of claim 5, where accessing the data structure includes:
accessing a lookup table using the identified APN type as a key to the lookup table.

7. The method of claim 1, where the selecting includes:
selecting a cellular network or a WiFi network as the one wireless network of the plurality of wireless networks,
the plurality of wireless networks including the cellular network and the WiFi network.

8. The method of claim 1, where the obtaining includes:
obtaining the signal strength measurement, the information identifying the level of congestion, and the information identifying the APN type, and
where the selecting includes:
selecting the one wireless network, of the plurality of wireless networks, based on the signal strength measurement, the information identifying the level of congestion, and the information identifying the APN type.

9. A device comprising:
a memory to store instructions; and
a processor to execute the instructions to:
receive, from a user of the device, configuration information identifying one or more factors relating to selecting an access network,
the one or more factors including at least one of a factor relating to signal strength or a factor relating to congestion,
receive a network access request,
identify the configuration information identifying the one or more factors, based on receiving the network access request,
perform, based on the configuration information, at least one of:
signal strength measurements of a first wireless network and a second wireless network,
the first wireless network including a cellular network and the second wireless network including a WiFi network, or
a determination of a level of congestion of the first wireless network and a level of congestion of the second wireless network,
access a data structure using information identifying an access point name (APN) type, of a plurality of APN types, associated with the network access request,
the data structure storing information identifying the plurality of APN types and information identifying a respective wireless network, of the first wireless network and the second wireless network, associated with each of the plurality of APN types, the plurality of APN types relating to browsing the Internet, placing a voice call, and running an application, select one of the first wireless network or the second wireless network based on performing the at least one of the signal strength measurements or the determination of the level of congestion of the first wireless network and the level of congestion of the second wireless network and based on accessing the data structure, and connect to the selected one of the first wireless network or the second wireless network.

10. The device of claim 9, where, when performing, the processor is to:

perform the signal strength measurements, and where, when selecting, the processor is to:
compare a signal strength measurement of the first wireless network to a signal strength measurement of the second wireless network, and
select the one of the first wireless network or the second wireless network based on comparing the signal strength measurement of the first wireless network to the signal strength measurement of the second wireless network.

11. The device of claim 9, where, when performing, the processor is to:

perform the determination of the level of congestion of the first wireless network and the level of congestion of the second wireless network, and where, when performing the determination of the level of congestion of the first wireless network and the level of congestion of the second wireless network, the processor is to:
cause a first request to be sent to a first device associated with the first wireless network,
cause a second request to be sent to a second device associated with the second wireless network,
receive, based on sending the first request, a first response from the first device,
the first response indicating the level of congestion of the first wireless network, and
receive, based on sending the second request, a second response from the second device,
the second response indicating the level of congestion of the second wireless network.

12. The device of claim 11, where, when selecting, the processor is to:

compare information indicating the level of congestion of the first wireless network to information indicating the level of congestion of the second wireless network, and
select, based on comparing the information indicating the level of congestion of the first wireless network to the information indicating the level of congestion of the second wireless network, the one of the first wireless network or the second wireless network.

13. The device of claim 9, where the processor is further to:
identify an action performed by the device, and
identify the APN type based on the identified action.

14. The device of claim 13, where, when accessing the data structure, the processor is to:
access a lookup table using the identified APN type as a key to the lookup table.

15. The device of claim 9, where, when performing, the processor is to:
perform the signal strength measurements and the determination of the level of congestion of the first wireless network and the level of congestion of the second wireless network, and where, when selecting, the processor is to:
select the one of the first wireless network or the second wireless network based on the signal strength measurements, the determination of the level of congestion of the first wireless network and the level of congestion of the second wireless network, and accessing the data structure.

16. The device of claim 9, where, when selecting, the processor is to:
select the one of the first wireless network or the second wireless network based on the signal strength measurements, the determination of the level of congestion of the first wireless network, and accessing the data structure.

17. A computer-readable medium for storing instructions, the instructions comprising:

one or more instructions, which, when executed by a processor of a user device, cause the processor to receive, from a user of the user device, configuration information identifying one or more factors relating to selecting an access network;

one or more instructions, which, when executed by the processor, cause the processor to detect a network access request,
the user device being connected to one of a first network or a second network,
the first network including a cellular network and the second network including a WiFi network;

one or more instructions, which, when executed by the processor, cause the processor to identify the configuration information identifying the one or more factors, based on detecting the network access request;

one or more instructions, which, when executed by the processor, cause the processor to obtain information identifying a level of congestion of the first network and information identifying a level of congestion of the second network based on the configuration information;

one or more instructions, which, when executed by the processor, cause the processor to compare the information identifying the level of congestion of the first network to the information identifying the level of congestion of the second network; and one or more instructions, which, when executed by the processor, cause the processor to select another one of the first network or the second network based on comparing the information identifying the level of congestion of the first network to the information identifying the level of congestion of the second network.

18. The computer-readable medium of claim 17, where the instructions further comprise:

one or more instructions which, when executed by the processor, cause the processor to compare signal strength measurements of the first network and the second network,
where the other one of the first network or the second network is selected further based on comparing the signal strength measurements.

19. The computer-readable medium of claim 17, where the one or more instructions which cause the processor to obtain the information identifying the level of congestion of the first network and the information identifying the level of congestion of the second network include:
one or more instructions to cause a first request to be sent to a first device associated with the first network, one or more instructions to cause a second request to be sent to a second device associated with the second network, one or more instructions to receive, based on sending the first request, a first response from the first device,
the first response indicating the level of congestion of the first network, and one or more instructions to receive, based on sending the second request, a second response from the second device,
the second response indicating the level of congestion of the second network.

20. The computer-readable medium of claim 17, where the instructions further comprise:

one or more instructions which, when executed by the processor, cause the processor to determine an access point name (APN) type associated with the network access request, where the other one of the first network or the second network is selected further based on the APN type.

* * * * *